Patented June 9, 1931

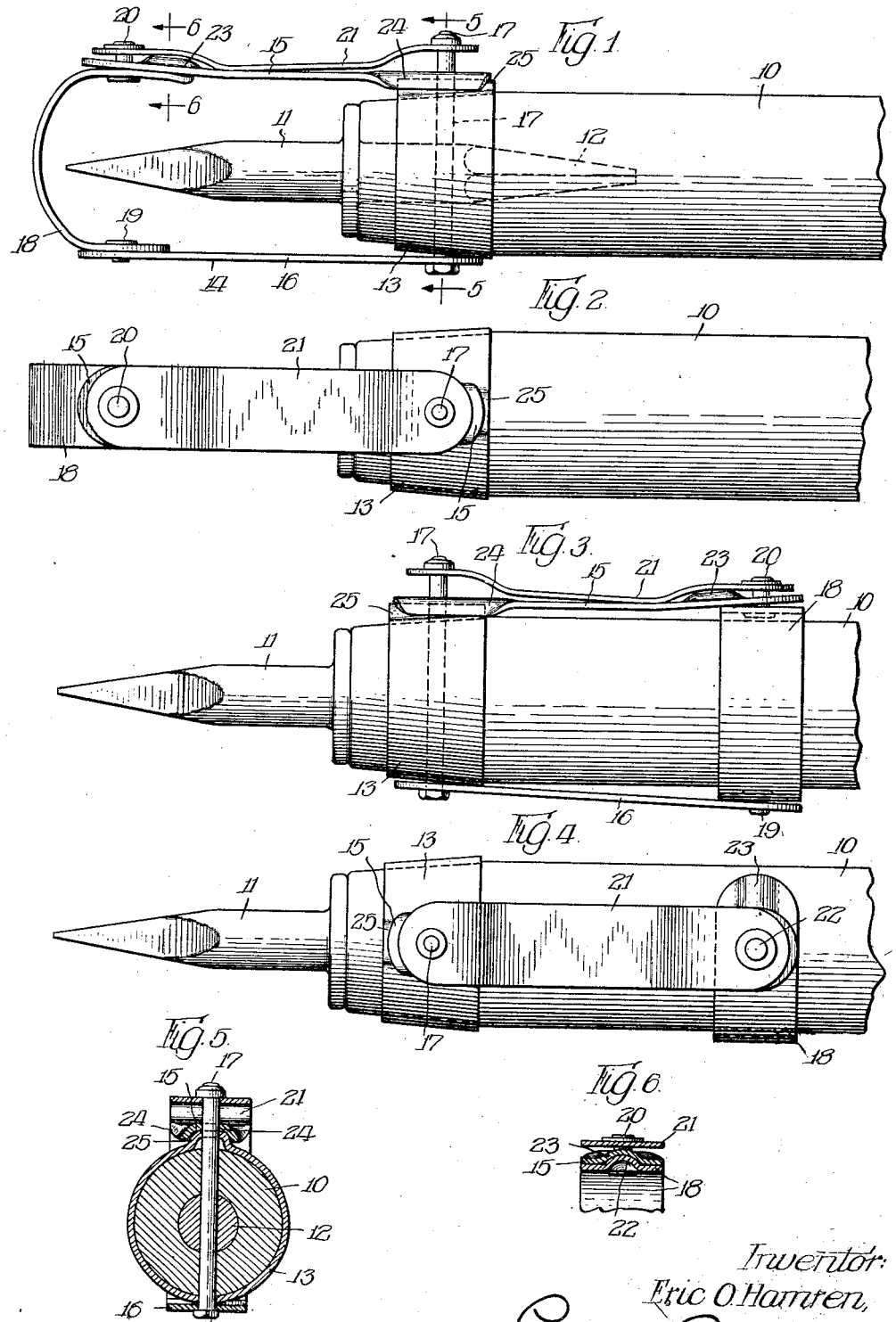

1,808,892

UNITED STATES PATENT OFFICE

ERIC O. HAMREN, OF OSHKOSH, WISCONSIN, ASSIGNOR TO LEACH COMPANY, OF OSHKOSH, WISCONSIN, A CORPORATION OF WISCONSIN

PIKE POLE GUARD

Application filed March 1, 1930. Serial No. 432,372.

In line construction work the pike poles used are the cause of frequent and sometimes very serious injuries to the workmen while being transported or otherwise not in use.

The object of the present invention is to provide a novel pike pole guard which gives adequate protection, which may easily and quickly be moved from a protecting position about the pike to an inoperative position back along and in alignment with the pole while the pike is in use, which is held back by coacting projections and conforming portions whereby to prevent the guard from getting in the way while the pole is in use, which does not add noticeably to the weight of the pole, and which is inexpensive to manufacture and apply.

One form of the invention is presented herein for the purpose of exemplification, but it will of course be appreciated that the invention is susceptible of embodiment in other structurally modified forms coming equally within the contemplated scope of the appended claims.

In the accompanying drawings:

Fig. 1 is a side view of the head of a pike pole, showing the improved guard of the invention in its operative or protecting position;

Fig. 2 is a different side view of the same;

Fig. 3 is a side view corresponding to Fig. 1, showing the guard in its inoperative or swung-back position alongside the pole;

Fig. 4 is a side view corresponding to Fig. 2, showing the guard in its inoperative position;

Fig. 5 is a transverse section, taken on the line 5—5 of Fig. 1; and

Fig. 6 is a transverse section, taken on the line 6—6 of Fig. 1.

The assembly shown in the drawings consists of a pole 10, a pike 11 which has an anchoring portion 12 embedded within the pole, a collar 13 which fits about the end of the pole, and a U-shaped frame 14 which extends forwardly about the pike and is arranged with the rear ends thereof at opposite sides of the collar.

The frame 14 consists of two substantially straight side strips 15 and 16 which are attached to the collar at opposite sides thereof by a pin 17 which pin provides a pivotal mounting for the side strips. At the front ends of the side strips is a curved front strip 18 which is attached to the side strips by pins 19 and 20 which pins together provide a pivotal mounting for the front strip.

A spring 21, which is fastened to the guard frame at one end by the pin 20 and at the other by the pin 17, presses a positioning formation 22 (Fig. 6) on the front strip into a conforming portion 23 on the side strip 15, whereby to yieldingly hold the front strip in a protecting position about the pike, as shown in Figs. 1 and 2. The spring 21 likewise presses two edge flanges 24 on the side strip 15 (Fig. 5) laterally over a rib-like positioning formation 25 on the collar, whereby to yieldingly hold the guard frame either in the operative forwardly swung protecting position shown in Figs. 1 and 2 or in the rearwardly swung inoperative position shown in Figs. 3 and 4, in which latter position the sides of the guard frame are disposed at diametrically opposite sides of the pole. The pin 17 extends through the spring, the side strips, the collar, the end of the pole and the anchoring portion of the pike, whereby to hold the assembly together and to provide a pivotal mounting for the guard frame.

The entire guard frame may be swung back from the protecting position about the pike shown in Figs. 1 and 2 to the inoperative position back and about the pole and in alignment therewith as shown in Figs. 3 and 4.

I claim:

1. The combination with a pole, and a pike at one end thereof, of an improved guard removably associated with the pike, said guard being pivotally mounted on the pole whereby to permit the guard to be swung forwardly into a protective position with respect to the tip of the pike or backwardly into an inoperative position alongside the pole and in alignment therewith.

2. The combination with a pole, and a pike at one end thereof, of a generally U-shaped assembly of parts which resiliently embraces the pole rearwardly of the pike and is pivoted at its ends to opposite sides of the pole.

3. The combination with a pole, and a projecting pike having an anchoring portion embedded in one end of the pole, of a collar on the end of the pole having a positioning formation, a U-shaped guard frame arranged about the pike end thereof at opposite sides of the collar, and a pin extending through the ends of the frame, the collar, the end of the pole and the anchoring portion of the pike for holding the assembly together and forming a pivotal mounting for the frame.

4. The combination with a pole, and a projecting pike at one end thereof, of a U-shaped guard frame consisting of two side strips pivotally mounted on the pole, and a curved bar pivotally connected to the free ends of the strips.

5. The combination with a pole and a pike at one end thereof, of a guard frame consisting of two side strips pivotally mounted on the pole and a curved front strip pivotally mounted on the front ends of the side strips, said connecting front strip having a positioning formation adjacent one end thereof, and one of said side strips having a conforming position for coaction therewith to hold said connecting front strip in alignment with said side strip.

6. The combination with a pole and a pike at one end thereof, of a collar on the pole, and a generally U-shaped guard frame pivotally mounted on the collar for forwardly swinging movement into a protecting position about the pike, said collar having a positioning formation at one side thereof, and said frame having a conforming portion in spring-pressed coaction therewith for holding the frame in its protecting position.

7. The combination with a pole and a pike at one end thereof, of a generally U-shaped guard frame pivoted to the pole for swinging movement into a protecting position about the pike, said frame being jointed to permit the sides of the same to be swung backwardly into positions at diametrically opposite sides of the pole.

8. The combination with a pole and a pike at one end thereof, of a jointed foldable U-shaped guard pivoted to the pole for swinging movement into protecting position about the pike, and spring means attending to prevent folding of the guard.

In witness whereof I have hereunto subscribed my name.

ERIC O. HAMREN.